United States Patent
Schorum et al.

[15] 3,690,311
[45] Sept. 12, 1972

[54] ULTRASONIC SCANNING APPARATUS WITH TRANSDUCER SCANNING RATE-RESPONSIVE TRANSMITTER

[72] Inventors: Stanley W. Schorum, Park Ridge; Wonjin Song, Arlington Heights, both of Ill.

[73] Assignee: Zenith Radio Corporation, Chicago, Ill.

[22] Filed: May 27, 1971

[21] Appl. No.: 147,579

[52] U.S. Cl. .................... 128/2 V, 73/67.8, 128/24 A
[51] Int. Cl. ............................................... A61b 5/00
[58] Field of Search..128/2 A, 2 R, 2 V, 2.1 R, 24 A; 73/67.85, 67.9

[56] References Cited

UNITED STATES PATENTS

| | | | |
|---|---|---|---|
| 3,005,335 | 10/1961 | Erdman | 73/68.7 |
| 3,086,390 | 4/1963 | Brown | 128/2 V |
| 3,256,733 | 6/1966 | Carlin | 128/24 A |

Primary Examiner—William E. Kamm
Attorney—John P. Pederson and R. A. Blackstone

[57] ABSTRACT

An ultrasonic medical diagnostic apparatus for scanning an object at a predetermined rate and generating a two-dimensional anatomical map of a plane section thereof. A position-sensing transducer develops an electrical signal corresponding to the orientation of an ultrasonic transducer. A function generator is responsive to the electrical signal for generating a voltage proportional to the rate of change of position of the ultrasonic transducer. This voltage is applied to a voltage-controlled oscillator which in turn varies the transmission rate of an ultrasonic transmitter-receiver in accordance with the scanning rate of the ultrasonic transducer. A second function generator and oscillator subsystem, together with a switch, are employed to switch to the more accurate of the two subsystems.

4 Claims, 4 Drawing Figures

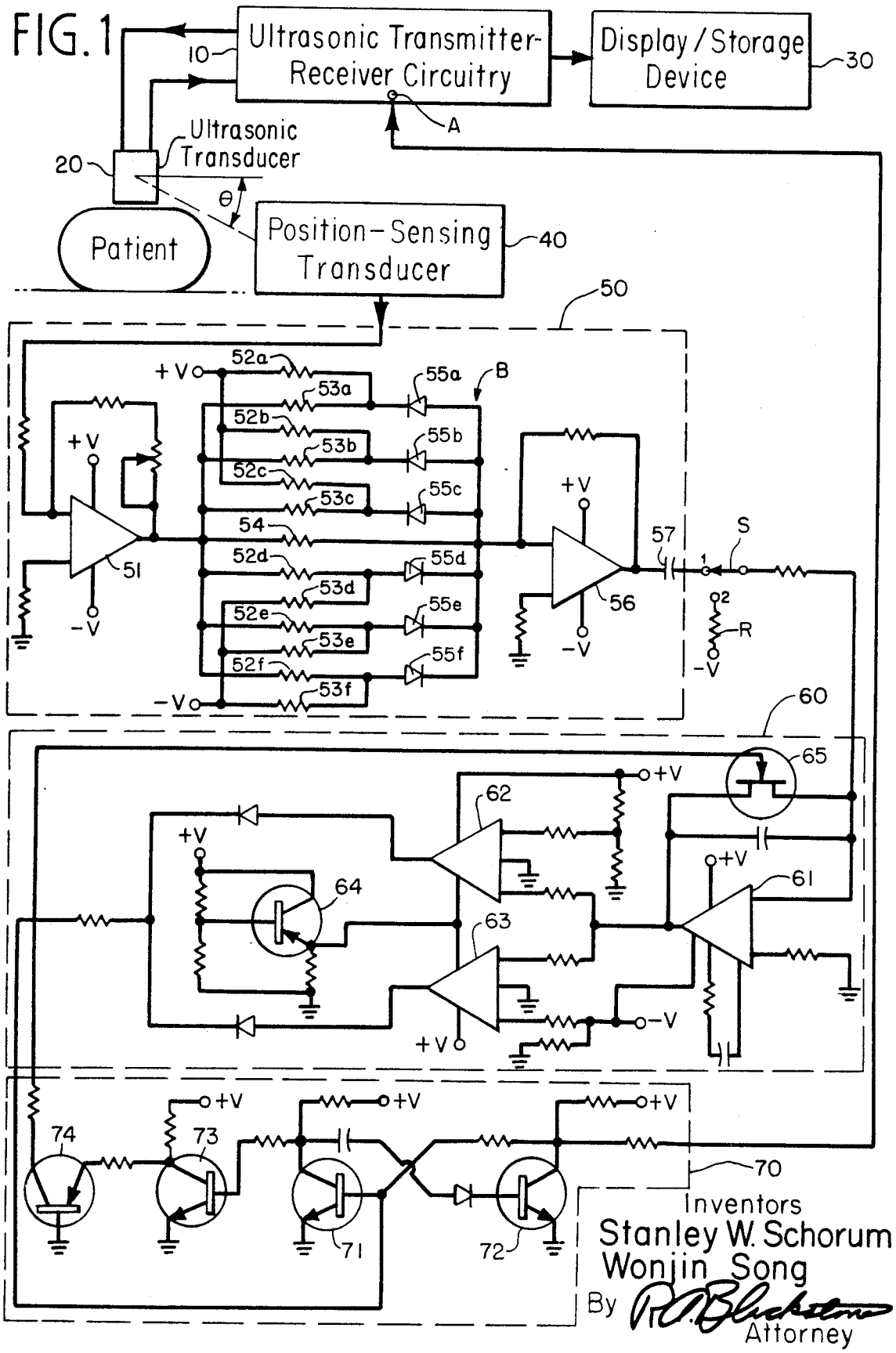

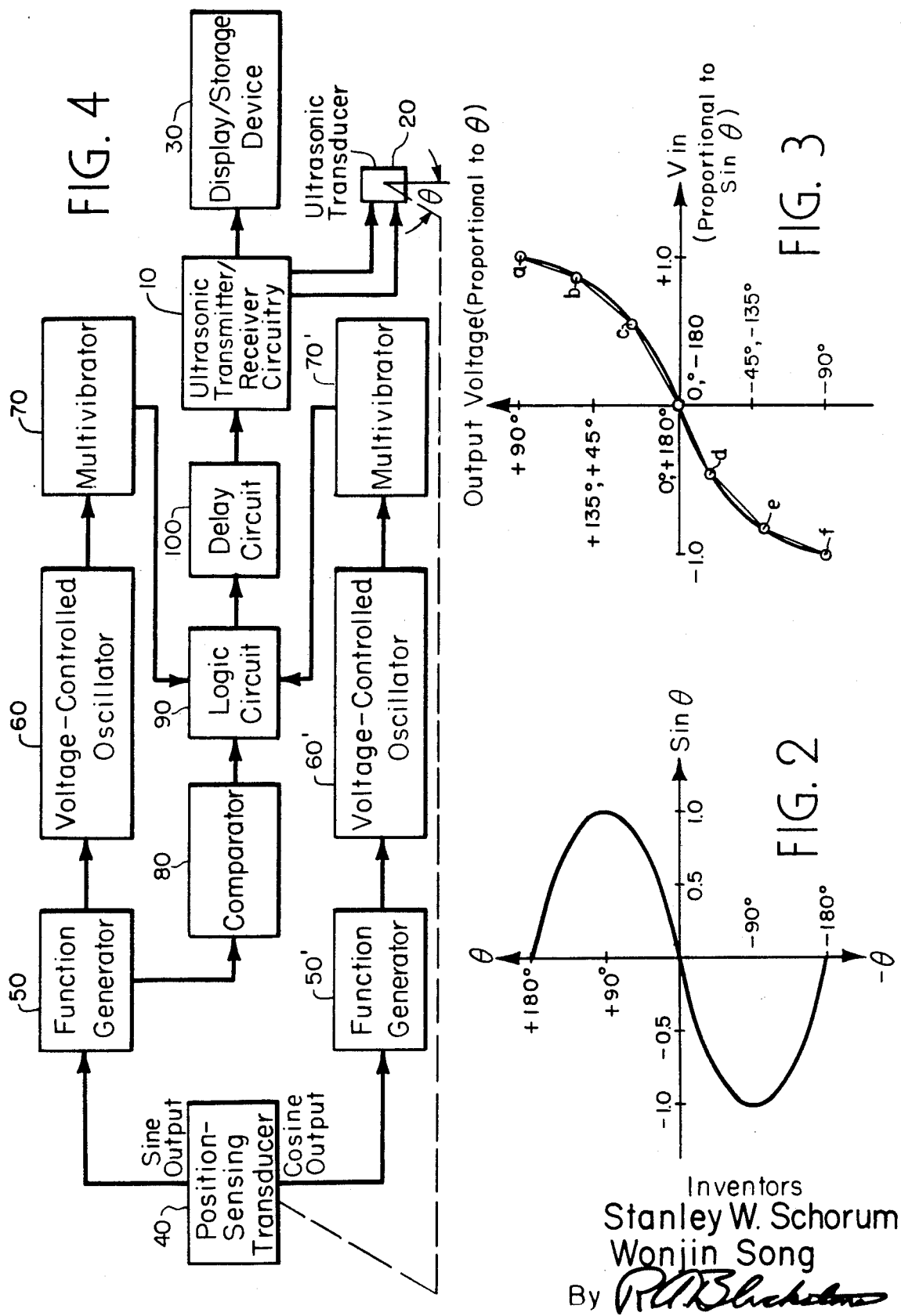

ULTRASONIC SCANNING APPARATUS WITH TRANSDUCER SCANNING RATE-RESPONSIVE TRANSMITTER

BACKGROUND OF THE INVENTION

Ultrasonic pulse-echo systems have been used with some degree of success for examination of the interior of the patient's body. Ultrasonic systems have several advantages over X-ray devices used for these purposes including a simpler operation, a more compact construction, and quicker results. Moreover, the use of ultrasonic energy eliminates whatever danger that might be involved in repeated exposure of a patient to X-rays. Another very important advantage of ultrasonic exploration of this nature is its ability to present an accurate cross-sectional anatomical "map" of a plane section through the human body to thereby enable observation of a tumor, for example, which would be obscured or even made invisible to X-rays by nearby bone structure.

Conventional ultrasonic diagnostic equipment of this type utilizes the basic pulse-echo principle employed in other systems such as sonar. Short pulses of acoustic energy are transmitted from a directional ultrasonic transducer. An echo signal returns from each boundary between media of different acoustic impedances and is received by a separate transducer. In some applications both the transmitting and receiving functions are combined in a single transducer. In the human body, the boundary between differing tissues usually creates such an echo signal. The location of the boundary is determined by measuring the time between the emitted pulse and the reflected echo. In measuring the time for the echo to return to the ultrasonic transducer, of course, the acoustic velocity in the medium (e.g., the human body) is taken into account.

A two-dimensional anatomical map of a plane section through the human body may be obtained by employing such an ultrasonic device together with a scanning mechanism which enables the ultrasonic transducer to be moved around the surface of a patient's body in a planar path which maximizes the probability that one or more echoes is obtained from each point of interest. Better results have been obtained when the scanner has used a compound motion; that is, as the transducer follows a planar path around the surfaces of the patient's body it is simultaneously oscillated or scanned back and forth within the plane to thereby produce a compound motion. The anatomical map is produced by displaying the received echoes as light flashes on a cathode-ray tube (CRT) at positions corresponding to the location(s) of reflecting interface(s) within the body. These light pulses are then accumulated on photographic film or a storage CRT.

In typical applications, the ultrasonic transducer is handheld by an operator who, within the confinement of a mechanical linkage mechanism that restricts transducer movement to a single plane, manually moves the transducer along any predetermined planar path on the outside of the patient's body. Thus, the angular orientation of the ultrasonic transducer as well as the path travelled around the patient is determined solely by the operator except for the predetermined mechanical restriction of its path to that of a single plane. The pulsing rate of conventional scanners is fixed at a rate typically between 300 and 1,000 pulses per second.

Two significant problems in conventional ultrasonic devices of this type are overexposure of the recording medium (i.e., the photographic film or the CRT) and variations in displays of repeated scannings of the same object, both of which are due to the practically unavoidable variation in scanning rates employed by different operators as well as non-uniformity in the scanning rate of a given operator. The former problem results primarily because of the transducer being held in one position too long, which creates a serious resolution problem, whereas the latter problem reduces the reliability of the results because they are greatly dependent on the particular operator and his particular scanning rate techniques.

It is therefore a primary object of this invention to produce a new and improved ultrasonic diagnostic scanning device.

It is a more specific object of the invention to produce such a new and improved scanning device which generates a display having greater resolution and less variation in results with different operators.

SUMMARY OF THE INVENTION

An improved ultrasonic medical diagnostic apparatus constructed in accordance with the invention comprises an ultrasonic transducer and an ultrasonic transmitter-receiver for generating ultrasonic electrical signals at a predetermined transmission rate for application to the transducer and for receiving electrical signals corresponding to reflected signals detected by the transducer. A position-sensing transducer is coupled to the ultrasonic transducer for developing an electrical signal corresponding to the position of the ultrasonic transducer. A function generator is coupled to the position-sensing transducer and is responsive to the electrical signals therefrom for generating a control effect proportional to the rate of change of position of the ultrasonic transducer. Also provided is a voltage-controlled oscillator responsive to the control effect for producing a periodic pulse signal having a repetition rate corresponding to the control effect, with the signal being applied to the trigger input of the ultrasonic transmitter-receiver to thereby vary the ultrasonic transmission rate in accordance with the scanning rate of the ultrasonic transducer.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIG. 1 is a schematic diagram of a preferred embodiment of the invention;

FIG. 2 is a graphical representation of the waveform of a signal utilized by the embodiment of the invention shown in FIG. 1;

FIG. 3 is a graphical representation of an input-output voltage characteristic of the embodiment of the invention shown in FIG. 1; and FIG. 4 is a block diagram of another preferred embodiment of the invention.

Description of the Preferred Embodiments

With reference to FIG. 1, there is shown an improved ultrasonic medical diagnostic apparatus which illustrates the general principles of the invention. The apparatus comprises an ultrasonic transmitter-receiver 10 for generating ultrasonic electrical pulse signals at a predetermined nominal transmission rate for application to ultrasonic transducer means 20 and for receiving electrical signals (echoes) corresponding to reflected signals detected by transducer 20. As described below, the predetermined transmission rate may be one which varies in accordance with the rate of change in position of the ultrasonic transducer. Although the invention is described in a medical environment, it is understood that it may be quite useful in other applications, such as industrial examination of parts/materials or the like. Moreover, while the embodiment shown in FIG. 1 utilizes a single transducer for transmitting and receiving, it is also understood that the ultrasonic transducer means may also comprise separate transmitting and receiving transducers. Ultrasonic transmitter-receiver 10 and ultrasonic transducer 20 may comprise conventional ultrasonic echo-ranging equipment currently used in medicine for studies of the soft tissue structures of the human body. For the practice of this invention, however, it is necessary to provide a trigger input terminal A for transmitter-receiver 10. Application of a suitable input signal at terminal A controls the transmission rate of transmitter-receiver 10, as described below in greater detail.

The display/storage device 30 may of course take on several forms including that of a cathode-ray tube (CRT) oscilloscope of the type which stores the displayed signal for a predetermined period of time. Moreover, a camera may be employed to photograph the oscilloscope CRT (conventional or storage) display to thereby obtain a permanent record of the displayed signal. The range of light levels (i.e., "grey-scale" readout) available on conventional CRT's is relatively narrow, as is that of the photographic film, but some degree of improvement in resolution may be obtained with proper selection of oscilloscope/camera adjustments. Nevertheless, the light level to which any given element of CRT phosphor or photographic emulsion is exposed is determined by the light per pulse available and the total number of light pulses to which that element is exposed. Consequently, even a relatively well-trained operator may inadvertently over-expose or underexpose the film, or because of his skill even bias (consciously or unconsciously) the results in a particular direction.

The mechanical linkage (not shown) used to support ultrasonic transducer 20 may be of any conventional type which confines the transducer motion to a single plane and permits manual movement of the transducer in this plane including the above-mentioned oscillatory movement. In accordance with the invention, a position-sensing transducer 40 is coupled to the ultrasonic transducer 20 for developing an electrical signal corresponding to the angular position of ultrasonic transducer 20 relative to the patient. Position-sensing transducer 40 may be a device comprising one or more conventional magnetic resolvers utilizing four-winding, rotating secondary transformers which in combination provide output voltages proportional to the sine and cosine of the angle $\theta$. Examples of similar sine/cosine resolvers utilizing potentiometers and suitable for this application are discussed in U.S. Pat. No. 3,555,888 to Brown. A function generator 50 is coupled to position-sensing transducer 40 and is responsive to the electrical output signals therefrom for generating a control effect proportional to the rate of change of position of ultrasonic transducer 20. Either resolver output voltage, sine or cosine, may be utilized for this purpose. In the embodiment shown in FIG. 1, function generator 50 provides an output voltage which is proportional to the value of $\theta$ (which may be any convenient reference angle) for an input voltage proportional to the value of sine $\theta$. Thus generator 50 may be referred to as an arc sine generator.

As shown in FIG. 2, for a given value of sine $\theta$ there are two values of $\theta$. To avoid this ambiguity, generator 50 is designed to detect the magnitude of the time derivative of $\theta$; thus generator 50 need provide only the positive and negative branches of the arc sine curve between minus 90° and plus 90°.

The output characteristic of arc sine function generator 50 is shown in FIG. 3. This output signal is an approximation obtained by a method known as linear segment approximation; that is, the positive and negative portions of the arc sine curve between plus 90° and minus 90° are approximated by a series of straight line segments of increasing slope. Such an approximation provides adequate accuracy for purposes of this invention. In carrying out this approximation, an amplifier 51 is used in the embodiment shown in FIG. 1 to increase the signal level of the output signal from transducer 40 for application to an electronic switching matrix of resistors 52a – 52f, 53a – 53f, 54 and diodes 55a – 55f. Diodes 55a – 55f are biased by resistors 52a – 52f, respectively, so that as the value of the output voltage of amplifier 51 changes, resistors 53a– 53f are successively switched into the matrix to thus develop at terminal B the linear approximation curve of FIG. 3. Resistors 52a and 53a and diode 55a combine to provide an output voltage corresponding to point "a" (90°) on the graph in FIG. 3. Resistors 52b and 53b and diode 55b combine to provide point "b" on the graph in FIG. 3, etc., with resistor 54 providing the zero point. The accuracy of this approximation may therefore be increased or decreased by increasing or decreasing the number of resistor-diode networks so employed, as desired. The more networks employed, the shorter the distance between data points and thus the straight-line approximation segments more closely conform to the shape of the curve being approximated.

To complete function generator 50, a differentiating circuit comprising an operational amplifier 56 and a coupling capacitor 57 is provided. The output signal of the resistor-diode network of generator 50 is thus differentiated to provide a control effect in the form of a voltage which is proportional to the angular velocity of transducer 20. A switch S is provided with terminals 1 and 2 as shown. With switch S in position 1, the device works in accordance with the variable transmission rate aspect of the invention; in position 2, the device provides a uniform transmission rate as hereinafter described in greater detail.

A voltage-controlled oscillator 60 is responsive to the control effect developed by function generator 50 for producing a periodic pulse signal having a repetition rate corresponding to the control effect. This periodic signal may be applied directly to the trigger input terminal A of ultrasonic transmitter receiver 10, or as in this embodiment, it may be preferable to standardize the pulses by the addition of a multivibrator circuit 70 between oscillator 60 and terminal A. Oscillator 60 is essentially conventional in construction and comprises amplifiers 61, 62 and 63, with the associated biasing circuitry, as well as a voltage-regulating transistor 64 and its associated biasing resistors. A field effect transistor 65 is provided as shown to establish the requisite feedback signal for oscillator 60. Multivibrator 70 is also essentially conventional and comprises transistors 71 and 72; in addition, transistors 73 and 74 are included to regulate the trigger pulses applied to terminal A. Thus, the output signal of oscillator 60 is a pulse train whose frequency is proportional to the time rate of change of the relative orientation of transducer 20.

With this construction, it is seen how the invention varies the transmission rate of transmitter-receiver 10 in accordance with the scanning rate of ultrasonic transducer 20 so that the aforementioned overexposure and underexposure problems are overcome. Should the operator maintain the transducer in a given orientation for a period of time, the system constructed in accordance with the invention reduces the transmission rate of the transmitter to a level that prevents overexposure. Conversely, should the operator suddenly change the orientation of the transducer and thereby rapidly scan a portion of the object, the invention increases the transmission rate to a level that prevents underexposure. For the embodiment of the invention illustrated in FIG. 1, the transmission rate ranges from approximately one hertz when the transducer is motionless to a maximum of approximately 1,000 hertz. This maximum rate is so limited to allow for echo signals returning from distances up to 75 cm. Placing switch S in the "2" position applies a uniform voltage to oscillator 60 to cause the transmission rate to remain uniform, where such is desired. The uniform rate (e.g., 1,000 hertz) is determined by the voltage which is applied to oscillator 50 from DC source V by means of resistor R.

A practical problem that can arise with the embodiment shown in FIG. 1 when the transducer is moved to its extreme orientation is best described with reference to FIG. 3 where it may be observed that for values of $\theta$ of plus 90° and minus 90° the arc sine curve becomes vertical. This implies that, for values of sine $\theta$ equal to ±1, the gain of the function generator must be infinite, which is necessarily a practical impossibility. In addition, it may be observed that for values of sine $\theta$ near unity the error of the arc sine function generator becomes rather large. It follows that at these points on the arc sine curve the derivative approaches zero. Thus, regardless of how fast the transducer is rotated, the transmission rate is approximately zero, resulting in a blind spot of about 6° wide as the angle $\theta$ passes through plus 90° or minus 90°.

To overcome this problem, the embodiment of the invention shown in FIG. 4 is provided which comprises a pair of function generators 50, 50', voltage controlled oscillators 60, 60', and multivibrators 70, 70', all of which may be identical to those used in the embodiment of FIG. 1. As mentioned earlier, position-sensing transducer 40 typically provides both the sine output signal and cosine output signal. Noting that the function generator 50 works equally well with either the sine $\theta$ or cosine $\theta$ input signal, and that the blind spots of the sine $\theta$ curve are rotated 90° on the cosine $\theta$ curve, the embodiment of FIG. 4 generates both pulsing rates and applies the more accurate one to ultrasonic transmitter receiver circuitry 10. This is accomplished by employing a comparator circuit 80 which, in this embodiment, is responsive to the electrical signal from function generator 50 (the sine signal) for generating an indicating signal when the magnitude of the sine signal exceeds a predetermined value. It is understood that the electrical signal from function generator 50' (the cosine signal) may be used equally as well. The optimum value for switch has been determined to be 0.7. A switching circuit 90 is coupled to the outputs of both oscillators 60, 60' through multivibrators 70, 70', respectively, and is responsive to the indicating signal from comparator 80 for selectively applying one of the periodic pulse signals to the trigger input A of the transmitter-receiver 10, whereby the transmission rate is varied in accordance with the scanning rate of the ultrasonic transducer. A delay circuit 100 is coupled between switching circuit 90 and ultrasonic transmitter-receiver 10 to prevent the premature generation of a transmitter pulse during the changeover. It should be pointed out that by incorporating the changeover feature of the invention, each function generator 50, 50' requires only four linear segments to approximate the arc function adequately. Moreover, by thus discarding the algebraic signal of the computed angle, the arc-since function generator can be preceded by a high-quality rectifier. Although the embodiment of FIG. 4 is somewhat elaborate, the circuits employed are readily available in monolithic integrated-circuit (IC) form and have become so inexpensive that the cost of the dual generator system is relatively low.

Thus there has been shown and described a new and improved ultrasonic diagnostic scanning device which generates a display having greater resolution and less variation and results with different operators. Moreover, the system of the invention provides a uniform, reliable display that is less susceptible to biasing by the particular operator involved. It has the advantages of instantaneous results and minimum possibility of radiation damage to the body being scanned.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. An improved ultrasonic medical diagnostic apparatus for scanning a patient at a predetermined variable scanning rate, comprising:
   ultrasonic transducer means having a variable position relative to said patient;
   an ultrasonic transmitter-receiver having a trigger input terminal for generating ultrasonic electrical signals at a predetermined nominal transmission rate for application to said transducer means and for receiving electrical signals corresponding to reflected signals detected by said transducer means;

a position-sensing transducer coupled to said ultrasonic transducer for developing an electrical signal corresponding to the position of said ultrasonic transducer;

a function generator coupled to said position-sensing transducer and responsive to the electrical signals therefrom for generating a control effect proportional to the rate of change of position of said ultrasonic transducer;

a voltage-controlled oscillator responsive to said control effect for producing a periodic pulse signal having a repetition rate corresponding to said control effect;

and means for applying said signal to the trigger input terminal of said ultrasonic transmitter-receiver to thereby vary the ultrasonic transmission rate in accordance with the scanning rate of said ultrasonic transducer.

2. An ultrasonic medical diagnostic apparatus according to claim 1, which further comprises means including a switch for decoupling said function generator from said voltage-controlled oscillator and coupling said voltage-controlled oscillator to a fixed reference voltage, whereby said transmitter-receiver is caused to have a uniform transmission rate.

3. An improved ultrasonic medical diagnostic apparatus scanning a patient at a predetermined variable scanning rate, comprising;

ultrasonic transducer means having a variable angular position relative to said patient;

an ultrasonic transmitter-receiver for generating ultrasonic electrical signals at a predetermined transmission rate for application to said transducer means and for receiving electrical signals corresponding to reflected signals detected by said transducer means, with the transmitter portion having a trigger input terminal;

a position-sensing transducer coupled to said ultrasonic transducer means for developing two electrical signals corresponding to the angular position of said ultrasonic transducer, one such signal corresponding to one trigonometric function of said angle and the other such signal corresponding to a different trigonometric function of said angle;

two function generators coupled to said position-sensing transducer and respectively responsive to the electrical signals therefrom for generating two control effects each proportional to the rate of change of position of said ultrasonic transducer;

two voltage-controlled oscillators respectively responsive to said control effects for producing two periodic pulse signals having repetition rates corresponding to said control effects;

means responsive to one of said electrical signals for generating an indicating signal when the magnitude of said signal exceeds a predetermined value;

and switch means coupled to both of said oscillators and responsive to said indicating signal for selectively applying one of said periodic pulse signals to the trigger input of said transmitter-receiver to vary said transmission rate in accordance with the scanning rate of said ultrasonic transducer.

4. An ultrasonic medical diagnostic apparatus according to claim 3, which further comprises a delay circuit coupled between said generating means and said switch means to prevent premature switching of said periodic pulse signals.

* * * * *